United States Patent [19]
Durst

[11] 3,906,058
[45] Sept. 16, 1975

[54] HIGH IMPACT TWO-COMPONENT RESIN BLENDS

[75] Inventor: Richard R. Durst, Stow, Ohio

[73] Assignee: The General Tire & Rubber Company, Akron, Ohio

[22] Filed: Apr. 29, 1974

[21] Appl. No.: 464,902

Related U.S. Application Data

[63] Continuation-in-part of Ser. No. 229,180, Feb. 24, 1972, abandoned, which is a continuation-in-part of Ser. No. 167,840, July 30, 1971, abandoned, which is a continuation-in-part of Ser. No. 99,272, Dec. 17, 1970, abandoned.

[52] U.S. Cl. ......... 260/876 B; 260/879; 260/880 B; 260/892; 260/DIG. 32
[51] Int. Cl.$^2$ ................... C08L 53/02; C08L 25/06
[58] Field of Search ..................... 260/876 B, 876 R

[56] References Cited
UNITED STATES PATENTS

| | | | |
|---|---|---|---|
| 3,231,635 | 1/1966 | Holden et al. | 260/876 B |
| 3,429,951 | 2/1969 | Childers | 260/876 B |
| 3,441,530 | 4/1969 | Bauer et al. | 260/876 B |
| 3,464,850 | 9/1969 | Haefele | 260/876 B |
| 3,576,913 | 4/1971 | Johnson et al. | 260/876 B |
| 3,614,836 | 10/1971 | Snyder et al. | 260/876 B |
| 3,641,205 | 2/1972 | La Flair et al. | 260/876 B |
| 3,781,383 | 12/1973 | Finestone et al. | 260/876 R |

FOREIGN PATENTS OR APPLICATIONS

| | | | |
|---|---|---|---|
| 1,053,596 | 1/1967 | United Kingdom | 260/876 B |
| 1,120,404 | 7/1968 | United Kingdom | 260/876 B |
| 1,457,763 | 9/1966 | France | 260/876 B |

*Primary Examiner*—Wilbert J. Briggs, Sr.

[57] ABSTRACT

A novel class of resins having excellent impact strength, flexural modulus and heat distortion characteristics consists essentially of blends of vinyl aromatic polymers and graded ABA block copolymers in which each A represents essentially polymerized styrene, the other monomer incorporated in the block being butadiene, and B represents essentially polymerized butadiene, the other monomer incorporated in the block being styrene. In each ABA block copolymer the weight ratio of total A to total B ranges from about 50:50 to 35:65. The block copolymers are preferably present in an amount sufficient to give a total styrene content, both as homopolymer and copolymer, of about 75 to 94, preferably 80 to 85, weight percent based on the total blend. In the blends of this invention, the discontinuous phase, made up of the graded block copolymers, is present in the form of particles of which at least 70%, preferably 85% or more, by weight have particle diameters in the range of 0.2 to 5 microns as measured by the "Zeiss Particle Size Analyzer".

16 Claims, No Drawings

HIGH IMPACT TWO-COMPONENT RESIN BLENDS

CROSS-REFERENCE TO RELATED APPLICATION

This application is a continuation-in-part of U.S. Pat. application Ser. No. 229,180, now abandoned, filed Feb. 24, 1972 as a continuation-in-part of U.S. Pat. application Ser. No. 167,840, now abandoned, filed July 30, 1971 as a continuation-in-part of U.S. Pat. application Ser. No. 99,272, filed Dec. 17, 1970, now abandoned.

BACKGROUND OF THE INVENTION

Previous efforts to develop a specific group of physical properties in a particular type of polymeric product have shown that the best single properties appear to be promoted in homopolymers and that any attempt to generate a combination of optimum physical properties by the preparation of copolymers from monomers whose homopolymers have a certain desired physical property tend to result in copolymers having a compromise in physical properties. This has been found even with the preparation of block copolymers. Efforts to combine the best features of two or more polymers in blends have usually resulted in products exhibiting discontinuities in properties with changes in proportions of the polymer ingredients, and in many cases the desirable properties of all of the polymer ingredients were lost, especially in blends of homopolymers. While these failures were first attributed to inadequate mixing procedures for dispersing one polymer in another, it now appears that such failures are due almost entirely to the inherent incompatibility of the polymers to be blended.

Various combinations of resinous polymers and rubbery polymers have been tried in efforts to produce new materials having some combination of the desirable properties of the ingredients with a minimum of the undesirable properties of the ingredients. In particular, extensive research has been instituted to develop vinyl aromatic polymer compositions, particularly polystyrene compositions, which have high impact strengths at both room temperature and temperatures at and below 0°F. and which also have good flexural modulus and heat distortion characteristics. Among the combinations which have been tried have been combinations of styrene-type polymers and butadiene-type polymers, especially such combinations using high proportions of styrene polymers to produce tough polystyrene molding compositions.

Block copolymers of the types AB, ABA, $(AB)_n$ and $(AB)_nA$ have been prepared, and in specific systems certain defined block copolymers have been used in combination with polymerized conjugated dienes, polymerized styrene-type monomers and combinations of the two polymers, sometimes with additional ingredients. In the original parent application reference was made to U.S. Pat. Nos. 2,727,878; 2,755,270; 3,231,635; 3,429,951; 3,441,530; 3,445,543; 3,449,469 and 3,464,850; and United Kingdom Pat. Nos. 1,053,596; 1,092,296; 1,120,404; 1,145,923 and 1,192,471. Other references which should be noted include U.S. Pat. Nos. 3,251,905; 3,322,856; 3,377,404 and 3,476,829; French Pat. No. 1,457,763; Japanese Pat. No. 27866/71 and published Dutch Pat. application No. 03376/66.

The subject application is directed particularly to two-component blends in which one component is a polystyrene and the other component is a graded ABA styrenebutadiene-styrene block copolymer. Of the references cited above, one of the most pertinent to the subject matter of this application is U.S. Pat. No. 3,429,951 which shows a blend of 75 parts by weight of polystyrene with 25 parts by weight of an AB block copolymer containing 25 weight percent of polymerized styrene and 75 weight percent of polymerized butadiene, the combination containing about 81 weight percent of styrene both as homopolymer and copolymer. The reference teaches the necessity of a peroxide cure to achieve the desired properties. No properties or utility are taught for the peroxide-free combination. There is no concern for particle size of the rubbery polymer nor is there any criticality taught as to the structure of the block copolymer.

Another reference of note is United Kingdom Pat. No. 1,053,596, which discloses a high impact polystyrene comprising 70 to 95 weight percent of polystyrene and 5 to 30 weight percent of an AB or ABA block copolymer in which the B block is 60 to 98 weight percent of the copolymer, at least 75 percent of the B block is saturated, the molecular weight of the A block is in the range of 5000 to 40,000 and the molecular weight of the B block is in the range of 30,000 to 200,000. There is no reference to the particle size of the discontinuous phase.

Another high impact polystyrene composition disclosed in French Pat. No. 1,457,763 is a blend of 97 to 70 weight percent of polystyrene and 3 to 30 weight percent of a styrene-butadiene copolymer which can be random, pure block or graded block. However, there is no reference to the particle size of the discontinuous phase.

The principal object of this invention is to provide a novel vinyl aromatic compound having high impact strength together with a good balance of other physical properties. Another object is to provide a novel blend of one or more vinyl aromatic homopolymers with a particular type of block copolymer. Another object is to provide such a novel blend which can be prepared by melt-mixing under shear as well as by solution blending techniques without a loss in desired properties. These objects as well as others which are apparent from this description are accomplished by this invention.

SUMMARY OF THE INVENTION

This invention consists essentially of blends of certain polymers of monovinyl-substituted monocyclic aromatic hydrocarbons such as styrene with certain graded block copolymers of the general configuration ABA wherein each A segment is essentially polystyrene block with some butadiene copolymerized therein and each B segment is essentially a polybutadiene block with some styrene copolymerized therein. These blends can be prepared satisfactorily by solution blending, mill mixing, high shear blender mixing as in a Banbury blender or any continuous mixer with sufficient attention to thorough mixing of components.

The blends of this invention provide for improvement in some physical properties of the continuous polystyrenetype phase without a significant reduction in the other physical properties. However, this improvement in properties depends largely upon the particle size of the discontinuous phase made up of agglomerated particles of the graded ABA block copolymer. The most effective particles must each have a particle diameter in the range of 0.2 to 5 microns although particles outside this range still have a detectable effect. Consequently, at least 70% by weight, preferably 85% by weight or more, of said particles must be in the recited particle size range. The physical state of the graded ABA block copolymers prior to incorporation into the sytrene-type polymer is only significant to the degree that it affects the particle size in the finished blend, said size also being directly affected by the amount of shear on the system during blending.

The blends of this invention are particularly useful for high-impact polystyrene sheeting as used, for example, in refrigerator interiors and for injection molded parts, e.g., vacuum cleaners housings.

DESCRIPTION OF THE PREFERRED EMBODIMENTS

High-impact polystyrene with an excellent balance of properties is produced by blending polystyrenes with graded ABA block copolymers in which each A represents essentially polymerized styrene and B represents essentially polymerized butadiene and the weight ratio of styrene to butadiene in A, B and A ranges from 35:65 to 50:50.

The styrene-type polymers (A) employed as matrices in the blends of this invention are preferably styrene homopolymers, but these polymers can be copolymers of styrene with alpha-methyl styrene or similar vinyl aryl monomers or copolymers containing at least about 90 weight percent of such vinyl aryl monomers, preferably monocyclic vinyl aryl including at least 35 weight percent copolymerized styrene. The styrene-type polymers can also contain not over about 10 weight percent total of other copolymerized ethylenically unsaturated compounds such as acrylic compounds such as acrylic and methacrylic acid; esters, amides and nitriles on the order of methyl methacrylate, ethyl acrylate, methacrylamide, fumaronitrile and acrylonitrile; cyclic unsaturated compounds such as the nuclear chlorostyrenes, vinyl naphthalene, vinyl carbazole and acenaphthylene; and conjugated unsaturates such as butadiene, isoprene, chloroprene, 2,3-dichlorobutadiene, piperylene and the like. In bulk polymerization, these resins are commonly prepared by heating the styrene and any comonomer at temperatures in the range of 100° to 200°C., with application of pressure, if necessary, to confine the monomers. The polymerization can also be carried out at lower temperatures by the addition of free-radical generating peroxidic catalysts such as benzoyl peroxide, acetyl peroxide, di-t-butyl peroxide and the like. The polymerization can also be carried out in suspension to yield a dry powder or in emulsion, usually resulting in a latex of polystyrene, which can be either coagulated to yield the solid powdery polystyrene or used as such for blending with the other constituent in the form of a latex. The polymerization can also be carried out in solution with precipitation of the product, if desired, by standard techniques such as steam-stripping.

The most important variable in the polystyrene constituent is its molecular weight. The vinyl aromatic or plastic polymer should have a number average molecular weight between about 50,000 and 500,000, preferably in the range of 100,000 to 300,000.

The graded ABA block copolymers (B) which can be employed in the blends of this invention are such that each A represents essentially polymerized styrene and B represents essentially polymerized butadiene. Graded ABA block copolymers differ from pure ABA block copolymers of the same molecular weight in that some of the A monomer, generally about 20 weight percent of the total A monomer, is included in the B block while some of the B monomer appears in the A blocks. On the other hand, in the pure ABA block copolymers the A blocks are all of A monomer while the B block is all B monomer. One manifestation of this fact is the difference in glass transition temperatures between pure block copolymers and graded block copolymers of essentially the same molecular weight. For styrene-butadiene-styrene block copolymers, the pure block copolymers generally show a glass transition temperature of about −105°C. for the polybutadiene block B and a glass transition temperature of about 105°C. for the polystyrene blocks A whereas the corresponding graded block copolymers of this invention show a glass transition temperature of about −90°C. ± 5°C. for the graded polybutadiene block. By thermal analysis, the glass transition temperature of the sytrene blocks in the graded block copolymers of this invention usually cannot be seen, but it is not essential.

In pure block copolymers, the principal or major A blocks should have number average molecular weights between 25 to 50 percent of the calculated number average molecular weight of the continuous polystyrene phase. However, in graded block copolymers because of the styrene monomer which is combined in the principally polybutadiene block the calculated polystyrene number average molecular weight of the polystyrene blocks in the graded block copolymer is closer to 30 to 70 percent of the calculated number average molecular weight of the continuous polystyrene phase. Thus, with a continuous polystyrene phase having a number average molecular weight of 120,000, each graded A block in the block copolymer should have a calculated number average molecular weight of from 36,000 to 84,000 and will show principal blocks having actual number average molecular weights in the range of about 30,000 to 60,000. For graded block copolymers having A:B ratios between 35:65 and 50:50 the total calculated number average molecular weights can range from about 120,000 to about 375,000. However, it has been found that the graded block copolymer should have a number average molecular weight in the range of 150,000 to 500,000, preferably about 200,000 to 300,000, in the compositions of this invention.

The initial particle sizes of the graded ABA block copolymers are not particularly critical in themselves. Of primary concern is the particle size of the discontinuous phase in the final blend. In order to get the optimum balance of properties in the finished blends of this invention with special emphasis on impact resistance, it is necessary that at least 70 percent, preferably 85 percent or more, by weight of the defined and claimed particles in the finished blends of this invention each have a particle diameter in the range of 0.2 to 5 microns. A minor amount, i.e., no more than 30 weight percent, of the particles in any finished blend can be outside the defined size range, but the particles having sizes below the defined range do not improve significantly physical properties of the blend as compared to the polystyrene alone, and the particles having sizes above the defined range tend to have an adverse effect on surface texture of the blends when vacuumformed, for example, although there is some apparent improvement in physical properties of the blend as compared to the polystyrene phase alone.

The preparation of graded block copolymers ABA is well known as shown in U.S. Pat. No. 3,287,333 and is also illustrated in EXAMPLE I below. The preferred solvents for such preparations are hexane and cyclohexane.

It should be noted that processing conditions have a great effect on molecular weights of all components and on particle size of the discontinuous phase. High shear mixing tends to reduce the particle size of the discontinuous phase. For the purposes of this invention, the particle size of the dispersed phase, once reduced below the stated minimums, cannot be corrected. The particle sizes of greatest importance apply to the dispersed particles in the final blended product. Particle size was determined optically or by electron microscopy.

The polymer blends of this invention consist essentially of styrene-type polymers as described above in amounts greater than 50 weight percent of the total blend, preferably at least about 65 weight percent of the total blend, and no greater than about 90 weight percent of the total blend. The graded block copolymers ABA are employed in the blends of this invention in amounts less than 50 weight percent and at least about 10 weight percent of the total blend, preferably no more than about 35 weight percent.

Particular combinations of the components of these blends within the range may give a particular combination of properties which are desired. The total vinyl aromatic, e.g., styrene, content in a given blend, both as homopolymer and copolymer, can be in the range of 75 to 94 weight percent of the total blend to achieve properties at least as good as the properties of presently-known "high impact" styrenes, but the total vinyl aromatic content should be preferably from about 80 to about 85 weight percent in order to achieve an optimum balance of properties such as impact, flexural and heat distortion characteristics.

Of particular interest are the blends of polystyrene or styrene copolymers containing at least about 90 weight percent of polymerized styrene with graded ABA block copolymers as described above in which the monomers employed are styrene and butadiene. Such blends can be prepared by properly melt mixing under shear stress without a significant decrease in physical properites over similar blends prepared in solution.

The blends of this invention can be prepared by any of the methods well known in the art as exemplified by the patent references cited above. Melt mixing under shear stress as in Banbury blenders, mills and/or continuous mixers has proven to be successful for the blends of this invention.

The following examples are illustrative of the best presently known methods and alternative methods of preparing the compositions of this invention and are not intended to limit this invention which is properly delineated in the claims. Unless otherwise noted, all quantitative measurements are by weight.

EXAMPLE I

Block copolymer M employed in this example was a grades styrene-butadiene ABA block copolymer in which each A represents essentially a polymerized styrene portion, the total polymerized styrene amounting to 50 weight percent of the block copolymer, and B represents essentially a polymerized butadiene portion amounting to a total of 50 weight percent of the block copolymer. The subject block copolymer was prepared in an agitated benzene solution, there being sufficient benzene present at all times to give a solution containing no more than 10 weight percent solids. Styrene monomer was dissolved in benzene at room temperature. Sec-butyl lithium was added slowly until the first hint of light yellow color indicated that all impurities had reacted and would not interefere with the subsequent polymerization. Then sufficient butadiene was added to give the desired 50/50 styrene/butadiene weight ratio. Again sec-butyl lithium was added, this time in an amount calculated to react with any additional impurities without generating polymerization. A catalytic amount of low molecular weight dilithiopolyisoprene catalyst was then added, and the mixture was heated at 50°C. to produce a living graded ABA block copolymer having a number average molecular weight of about 250,000 and comprising a central portion rich in polybutadiene and terminal portions rich in polystyrene. The living copolymer was deactivated or killed by the addition of isopropanol until the solution became colorless. An antioxidant (2,6-di-t-butyl-paracresol) was added as an isopropanol solution of 0.01 gram of the antioxidant per milliliter of isopropanol such that there was about 1 weight percent antioxidant based on the initial weight of the butadiene.

The presently preferred method for making a graded block copolymer such as copolymer M involves the use of n-hexane rather than benzene, sufficient n-hexane being present at all times to give a solution containing about 15 weight percent solids. Styrene monomer and sufficient butadiene to give the desired styrene/butadiene weight ratio, e.g., 50/50, are dissolved in n-hexane at room temperature and heated to 150°F. At one percent solution of n-butyl lithium in n-hexane is then added slowly at 150°F. until there is a slight exotherm indicating that all impurities have reacted and will not interfere with subsequent polymerization. The dilithiopolyisoprene catalyst is added as before and the system is heated at 150°F. to produce the desired graded ABA block copolymer having a number average molecular weight generally in a range of about 225,000 to 250,000. The polymer is deactivated and the antioxidant added as before.

The graded ABA block copolymer solution can be used for solution blending or the solvents can be steam-stripped off leaving the graded ABA block copolymer as a fine crumb for milling, blending or other solid state mixing procedure.

Block copolymer M in benzene solution at 30°C. was solution blended with a commercial polystyrene having a number average molecular weight of 120,000 in amount to give a blend containing 60 weight percent pure polystyrene and 40 weight percent block copolymer M. The total styrene content of the polyblend was 80 weight percent. The block copolymer was present in the form of particles at least 70 weight percent of which had diameters between 0.2 and 5 microns. The polymer blend is best isolated by adding the benzene solution to agitated isopropanol. Precipitation of the polymer blend takes place. The resulting white polymer blend is then dried in a vacuum oven at 50°C. to a constant weight.

Test specimens of the polymer blend were prepared by placing the polymer blend between two plates coated with polytetra-fluoroethylene and heating to 370°F. for 1 minute to change the polymer blend into a fused disc which was cut into strips and compression molded at 370°F. for 10 minutes at 20,000 psi on a 4-inch ram into test bars 2.5 × 6 × 0.125 inches and 1.125 × 6 × 0.125 inches. Test specimens were cut from the test bars and were used in a number of tests including determination of flexural modulus by ASTM physical test method 2418, determination of notched Izod impact strength, and determination of heat distortion temperature (°C.) when test specimens had deflected 10 mils and 60 mils at an applied load of 264 psi.

The test specimens showed a flexural modulus of 204,000 psi, notched Izod impact strength of 9.7 ft.-lbs./inch notch, 10 mil deflection at 81°C. and 60 mil deflection at 94°C. By comparison, similarly prepared test specimens of a commercial "high impact" polystyrene and a commercial "high flexural modulus" polystyrene showed flexural moduli of 227,000 and 382,000 psi respectively, noticed Izod impact strengths of 1.60 and 1.15 ft.-lbs./inch notch respectively, 10 mil deflections at 79°C. and 75°C. respectively and 60 mil deflections at 88°C. and 84°C. respectively.

EXAMPLE II

A polymer blend was prepared according to the method of Example I except that the final blend contained 70 weight percent of the pure polystyrene and 30 weight percent of the block copolymer M resulting in a total styrene content in the polymer blend of 85 weight percent. Again, the block copolymer formed particles at least 70 weight percent of which had diameters between 0.2 and 5 microns.

Test specimens of this blend prepared and tested according to the methods described in Example I showed a flexural modulus of 257,000 psi, a notched Izod impact strength of 3.0 ft.-lbs./inch notch, 10 mil deflection at 90°C. and 60 mil deflection at 98°C.

EXAMPLE III

Graded block copolymers N and P can be prepared in the same way as block copolymer M in Example I except that the weight ratios of styrene to butadiene are 40/60 and 35/65 respectively instead of 50/50. The molecular weights of block copolymers N and P were in the number average molecular weight range of 160,000 to 285,000.

Polymer blends were prepared according to the method described in Example I containing the pure polystyrene of Example I and one of the block copolymers N and P in amounts to give total styrene contents in the polymer blends of 80 and 85 weight percent. In each case the block copolymer formed particles at least 70 weight percent of which had diameters in the range of 0.2 to 5 microns.

Test specimens of this blend prepared and tested according to the methods described in Example I showed the properties shown below.

TABLE

| Blend | III-A | III-B | III-C | III-D |
|---|---|---|---|---|
| Block Copolymer | N | N | P | P |
| Weight percent of |  |  |  |  |
| Polystyrene | 66.7 | 75.0 | 69.2 | 76.9 |

TABLE-Continued

| Block Copolymer | 33.3 | 25.0 | 30.8 | 23.1 |
|---|---|---|---|---|
| Flexural Modulus |  |  |  |  |
| (× 10⁵ psi) | 1.98 | 2.63 | 1.93 | 2.88 |
| Notched Izod Impact |  |  |  |  |
| (ft.-lbs./inch notch) | 9.1 | 7.0 | 8.7 | 6.7 |
| Heat Distortion Temp. (°C.) |  |  |  |  |
| 10 mil | 84 | 87 | 83 | 92 |
| 60 mil | 95 | 96 | 95 | 100 |

EXAMPLE IV

Polymer blends IV-A and IV-B were prepared like Blends III-B and III-D respectively from Example III according to the method described in Example I except that the respective total styrene contents were 88 and 87 weight percent respectively. Again, the block copolymers formed particles at least 70 weight percent of which had diameters in the range of 0.2 to 5 microns. Test specimens of these polymer blends prepared and tested according to the methods described in Example I showed respective flexural moduli of 298,000 psi and 295,000 psi, notched Izod impact strengths of 5.6 and 6.0 ft.-lbs./inch notch, 10 mil deflections at 82°C. and 83°C. and 60 mil deflections at 93°C. and 94°C.

EXAMPLE V

When polymer blends like Blends III-B and III-D above are prepared by mill mixing the components for 10 minutes at 325°F. in the absence of solvent, test specimens of the resulting blends prepared and tested according to the methods described in Example I show similar excellent balance of properties.

EXAMPLE VI

Two blends within the scope of this invention were prepared and compared with a commercial high modulus polystyrene.

Samples VI-A and VI-B were Banbury-blended mixtures of a commercial polystyrene having a number average molecular weight of about 104,000 and a graded block copolymer S prepared using the presently preferred method described in Example I except that the weight ratio of styrene to butadiene was 40/60 and the number average molecular weight was about 280,000. These mixtures were Banbury-blended for 6 minutes at a dump temperature of 430°F. In each case the block copolymer formed particles of which at least 70 weight percent had diameters in the range of 0.2 to 5 microns. Control Sample VI-C was a commercial high impact polystyrene prepared by the bulk free radical polymerization of styrene in contact with polybutadiene resulting in a grafted copolymer system.

Samples VI-A and VI-B were taken from the Banbury blender, milled just long enough to form sheets which were granulated and then injection molded to form the described test specimens. Sample VI-C was also injection molded to form the described test specimens. The described specimens were then tested for physical properties including determination of notched Izod impact strengths (Method A) at 73°F., −20°F. and −40°F., determination of flexural moduli by ASTM Test Method D-790-66 (0.1 inch per minute) at 160°F. (71.1°C.), 73°F. (22.8°C.) and −40°F. (−40°C.), and determination by ASTM Test Method D-648-56 of heat distortion temperature when test specimens had deflected 10 mils under 264 psi, both unannealed and after annealing for 2 hours at 165°F. (73.9°C.).

TABLE

| Sample | VI-A | VI-B | VI-C |
|---|---|---|---|
| Weight percent of | | | |
| Polystyrene | 75 | 87 | Control |
| Block Copolymer | 25 | 13 | |
| Notched Izod Impact (ft.-lbs./inch notch | | | |
| at 73°F. | 4.6 | 1.2 | 1.1 |
| —20°F. | 1.5 | 0.7 | 0.8 |
| —40°F. | 0.7 | 0.5 | 0.22 |
| Flexural Modulus ($\times 10^5$ psi) | | | |
| at 160°F. | 2.08 | 2.74 | 2.21 |
| 73°F. | 2.76 | 3.64 | 3.46 |
| —40°F. | 3.19 | 3.88 | 4.61 |
| Heat Distortion Temp. (°F.) | | | |
| Unannealed | 189 | 190 | 176 |
| Annealed | 199 | 199 | 185 |

Approximately the same results are obtained from Samples VI-A and VI-B when they are Banbury-blended for from about 4 minutes to about 10 minutes.

Compounds of this invention are of particular interest because of their excellent properties at low temperatures as well as at room temperatures. For example, polymer blends of this invention have excellent notched Izod impact strengths even at 0°F. and —40°F. In fact, the notched Izod impact strengths of the preferred polymer blends of this invention at —40°F. are as good as or better than the room temperature impact strengths of commercially available "high impact" polystyrene. Generally, it has been found that for the preferred polymer blends of this invention the impact strengths at 0°F. and —40°F. are about one-half and about one-third respectively of the impact strengths at room temperature.

Miscellaneous additives such as pigments can be included in the blends of this invention.

The compositions of this invention like previously known high impact polystyrenes are of particular use for toys and refrigerator linings, but they can also be further blended with other materials such as phenylene oxide homopolymers and copolymers of phenylene oxide with other comonomers to improve processing characteristics, impact strengths and the like to such other materials. Typical polyphenylene oxide systems are shown in U.S. Pat. Nos. 3,134,753; 3,306,875 and 3,382,212 and British Pat. Specification No. 930,993.

For the purposes of this invention, the discontinuous phase is dispersed in the continuous phase or matrix as particles at least 70 weight percent of which have particle diameters in the range of 0.2 to 5 microns as measured by the "Zeiss Particle Size Analyzer". This analyzer and its use is described in "New Techniques of Particle Analysis" by D. W. Montgomery in *Rubber Age*, February 1964.

I claim:

1. A composition characterized by exhibiting excellent properties such as impact strength at low temperatures as well as room temperatures, said composition consisting essentially of a blend of
   A. a matrix of polymers prepared from at least 90 weight percent monovinyl substituted monocyclic aryl monomers, any other monomers being other ethylenically unsaturated monomers, said polymers having a number average molecular weight of from about 50,000 to 500,000; and
   B. graded block copolymers of the type ABA in which each A segment represents essentially polymerized styrene, the balance of said segment being polymerized butadiene and each B segment represents essentially polymerized butadiene, the balance of said segment being polymerized styrene, the weight ratio of total A to B ranging from 50:50 to 35:65, the number average molecular weight of said block copolymers being from 150,000 to 500,000, said graded block copolymers having a principal glass transition temperature of about —90°C. ± 5°C.;

component (A) being present in an amount greater than 50 weight percent but no greater than 90 weight percent of said blend and component (B) being present in an amount less than 50 weight percent but at least 10 weight percent of said blend, component (B) being dispersed in component (A) as particles of which at least 70 weight percent have diameters in the range of 0.2 to 5 microns, and the total monovinyl monocyclic aryl units in components (A) and (B) being from 75 to 94 weight percent of the total units in said components.

2. A composition in accordance with claim 1 wherein the polymers in component (A) comprise at least 35 weight percent polymerized styrene.

3. A composition in accordance with claim 2 wherein the polymers in component (A) have a number average molecular weight of 100,000 to 300,000 and the copolymers in component (B) have a number average molecular weight of 200,000 to 300,000.

4. A blend in accordance with claim 3 wherein the average molecular weight of the A blocks in the copolymers in component (B) is between 25 and 50 percent of the calculated average molecular weight of the polymers in component (A).

5. A composition in accordance with claim 4 wherein the polymers in component (A) are polymerized monovinyl-substituted monocyclic aryl compounds.

6. A composition in accordance with claim 5 wherein component (A) consists essentially of polystyrene.

7. A composition in accordance with claim 6 wherein components (A) and (B) are present in such proportion that the total polymerized styrene content is from 80 to 85 weight percent of the total blend.

8. A method of making resins having excellent impact strengths, flexural moduli and heat distortion characteristics, particularly at low temperatures, comprising blending a mixture consisting essentially of
   A. a matrix of polymers prepared from at least 90 weight percent monovinyl substituted monocyclic aryl monomers, any other monomers being other ethylenically unsaturated monomers, said polymers having a number average molecular weight of from about 50,000 to 500,000; and
   B. graded block copolymers of the type ABA in which each A segment represents essentially polymerized styrene, the balance of said segment being polymerized butadiene, and each B segment represents essentially polymerized butadiene, the balance of said segment being polymerized styrene, the weight ratio of total A to B ranging from 50:50 to 35:65, the number average molecular weight of said block copolymers being from 150,000 to 500,000, said graded block copolymers having a principal glass transition temperature of about —90°C. ± 5°C.;

component (A) being present in an amount greater than 50 weight percent but no greater than 90 weight percent of said blend and component (B) being present in an amount less than 50 weight percent but at least 10 weight percent of said blend, component (B) being dispersed in component (A) as particles of which at least 70 weight percent have diameters in the range of 0.2 to 5 microns, and the total monovinyl monocyclic aryl units in components (A) and (B) being from 75 to 94 weight percent of the total units in said components.

9. A method in accordance with claim 8 wherein the mixture is blended in a mutual solvent and precipitated from said solvent.

10. A method in accordance with claim 8 wherein the mixture is blended by heating at a temperature of at least 310°F.

11. A method in accordance with claim 8 wherein the polymers in component (A) have a number average molecular weight of 100,000 to 300,000 and the copolymers in component (B) have a number average molecular weight of 200,000 to 300,000.

12. A method in accordance with claim 11 wherein the average molecular weight of the A blocks in the copolymers in component (B) is between 25 to 50 percent of the calculated average molecular weight of the polymers in component (A).

13. A method in accordance with claim 12 wherein component (A) consists essentially of polystyrene.

14. A method in accordance with claim 13 wherein component (B) is present in such an amount that the total polymerized styrene content is from 80 to 85 weight percent of the total blend.

15. A composition in accordance with claim 6 wherein component (B) is dispersed in component (A) as particles of which at least 85 weight percent have diameters in the range of 0.2 to 5 microns.

16. A method in accordance with claim 13 wherein component (B) is dispersed in component (A) as particles of which at least 85 weight percent have diameters in the range of 0.2 to 5 microns.

* * * * *